(12) United States Patent
Wang et al.

(10) Patent No.: US 10,448,418 B2
(45) Date of Patent: Oct. 15, 2019

(54) DECREASING FREE-RIDING DATA TRAFFIC IN UPLINK SCHEDULING

(71) Applicant: Telefonaktiebolaget LM Ericsson (publ), Stockholm (SE)

(72) Inventors: Liping Wang, Sollentuna (SE); Jing Fu, Solna (SE); Ying Sun, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/750,620

(22) PCT Filed: Aug. 18, 2015

(86) PCT No.: PCT/IB2015/056287
§ 371 (c)(1),
(2) Date: Feb. 6, 2018

(87) PCT Pub. No.: WO2017/029539
PCT Pub. Date: Feb. 23, 2017

(65) Prior Publication Data
US 2019/0021101 A1     Jan. 17, 2019

(51) Int. Cl.
*H04W 72/12*     (2009.01)
*H04W 28/24*     (2009.01)
(Continued)

(52) U.S. Cl.
CPC ....... *H04W 72/1242* (2013.01); *H04W 28/24* (2013.01); *H04W 72/121* (2013.01);
(Continued)

(58) Field of Classification Search
CPC ............. H04W 72/1242; H04W 28/24; H04W 72/121; H04W 72/1268; H04W 72/1284; H04W 72/14; H04W 28/0268
See application file for complete search history.

(56) References Cited

U.S. PATENT DOCUMENTS 8,660,083 B2  2/2014 Norlund et al.
2011/0216721 A1*  9/2011 Min ...................... H04W 72/04
370/329
(Continued)

FOREIGN PATENT DOCUMENTS

EP           1708524 A1    10/2006
WO      2014/142718 A1     9/2014

OTHER PUBLICATIONS

International Search Report & Written Opinion of the International Searching Authority dated Apr. 20, 2016 issued in corresponding PCT Application Serial No. PCT/IB2015/056287, consisting of 11 pages.

(Continued)

*Primary Examiner* — Anez C Ebrahim
(74) *Attorney, Agent, or Firm* — Sage Patent Group

(57) ABSTRACT

A method and node for uplink scheduling of a plurality of wireless devices in a communications network is provided. The method includes estimating, for each of a plurality of wireless devices, a buffer size corresponding to each of at least one radio bearer group (RBG), each of the at least one RBG being used by the wireless device to carry traffic via multiple bearers. The method further includes determining an uplink resource maximum allotment for each wireless device based, at least in part, on the estimated buffer sizes and a priority weight of each RBG used by the plurality of wireless devices. The priority weight of each RBG is based at least in part on quality of service (QoS) requirements of bearers carried by the RBG.

19 Claims, 6 Drawing Sheets

(51) Int. Cl.
*H04W 72/14* (2009.01)
*H04W 28/02* (2009.01)

(52) U.S. Cl.
CPC ... *H04W 72/1268* (2013.01); *H04W 72/1284* (2013.01); *H04W 72/14* (2013.01); *H04W 28/0268* (2013.01)

(56) References Cited

U.S. PATENT DOCUMENTS

2012/0039204 A1* 2/2012 Gao ................. H04W 72/0486
370/252
2014/0086159 A1 3/2014 Sajadieh et al.

OTHER PUBLICATIONS

Qualcomm Incorporated: "Uplink Scheduling Prioritization Solution for FPI Solution", SA WG2 Meeting #104, S2-142443, Agenda Item 7.2.1, Work Item / Release: UPCON/rel-13, Dublin, Ireland, Jul. 11, 2014, consisting of 10 pages.

* cited by examiner

Weight order:  RBG(1.1) > RBG(2.2) > RGB(2.1) > RBG(1.2)

| 40 | 20 | 25 | 50 |

|← 75*120% = 90 →|

Number of available SBs = 75
Utilization threshold = 120%

DECREASING FREE-RIDING DATA TRAFFIC IN UPLINK SCHEDULING

CROSS-REFERENCE TO RELATED APPLICATIONS

This application is a Submission Under 35 U.S.C. § 371 for U.S. National Stage Patent Application of International Application Number: PCT/IB2015/056287, filed Aug. 18, 2015 entitled "DECREASING FREE-RIDING DATA TRAFFIC IN UPLINK SCHEDULING" which is incorporated herein by reference.

TECHNICAL FIELD

The present disclosure relates to communication networks and in particular to a method and node for uplink scheduling of a plurality of wireless devices in a communications network.

BACKGROUND

In radio access networks, scheduling is a process that is used to achieve fair and efficient usage of the available radio resources. Scheduling can be used to control and determine which wireless device, e.g., user equipment (UE) should be communicating data with a particular node, e.g., base station, and which radio resources that communication should utilize. For example, in Long Term Evolution (LTE) networks, the uplink scheduler in the base station (i.e., an evolved NodeB, or "eNodeB") receives scheduling requests and buffer state reports (BSRs) from the wireless devices. The eNodeB (eNB) decides how to assign the available scheduling blocks (SBs) to the wireless devices based on information such as the total uplink capacity, each wireless device's buffer status and the Quality of Service (QoS) requirements, and each wireless device's channel quality for different frequencies. Based on this information, the eNB sends uplink scheduling grants to the wireless devices, and the wireless devices transmit data to the eNB according to the received scheduling grants.

With the emergence of newer wireless services, a wireless device typically needs to carry multiple services from multiple radio bearers simultaneously. Radio bearers are typically prioritized based on the QoS requirements of their carried services. For instance, a radio bearer with voice data usually has a higher priority than a bearer with non-real-time data from services such as web browsing and File Transfer Protocol (FTP), etc. To avoid substantial signaling load on the air interface, the radio bearers are usually grouped into multiple bearer groupings, such as (in the LTE network scenario) logical channel groups (LCGs), where each LCG can only contain services with similar QoS requirements. BSRs are sent by the wireless devices to the eNB to report their buffer status per LCG. The QoS requirements such as the priorities of radio bearers in an LCG are translated into a weight function, which is used to prioritize the LCGs in each Transit Time Interval (TTI) for scheduling. Wireless devices compete for scheduling resources in every TTI based on their weights. When a wireless device has multiple LCGs, its scheduling weight is set as the highest weight of its LCGs. Wireless devices having a higher weight receive a higher probability of being scheduled.

Due to the single-carrier property of typical access schemes used in uplink transmission, such as Single Carrier Frequency Division Multiple Access (SC-FDMA), the uplink scheduling scheme is usually per-wireless device based. Thus, the scheduling weight of a wireless device is set as the highest weight of its LCGs, and the wireless device's buffer size is set to the sum of the buffer size of all its LCGs. Thus, when a wireless device has multiple LCGs with different priorities, the scheduling of a lower priority LCG may occur, even though LCGs associated with other wireless devices might have higher priority LCGs. This is known as "free riding." In this case, if the uplink resources are limited, a higher priority LCG of another wireless device may not be scheduled due to the free-riding data from the lower priority LCG, leading to inefficient scheduling.

SUMMARY

The present disclosure advantageously provides a method and node for scheduling uplink transmissions from wireless devices in a communication network such that free-riding data of a lower priority radio bearer grouping can be minimized or avoided. An uplink scheduler located, for example, in the base station, can be configured to provide a tradeoff between fairness and efficient resource usage in order to decrease the free-riding data traffic, and better meet the QoS requirements of different services.

According to one broad aspect of the disclosure, a method for uplink scheduling of a plurality of wireless devices in a communications network is provided. The method includes estimating, for each of a plurality of wireless devices, a buffer size corresponding to each of at least one radio bearer group (RBG), each of the at least one RBG being used by the wireless device to carry traffic via multiple bearers. The method also includes determining an uplink resource maximum allotment for each wireless device based, at least in part, on the estimated buffer sizes and a priority weight of each RBG used by the plurality of wireless devices, the priority weight of each RBG being based at least in part on quality of service (QoS) requirements of bearers carried by the RBG. According to another embodiment of this aspect, each RBG contains bearer traffic having like QOS requirements.

According to another embodiment of this aspect, determining the uplink resource maximum allotment for each wireless device includes sorting each RBG in descending priority weight order, and assigning a maximum number of uplink resources to each sorted RBG in an order corresponding to the descending priority weight order of the RBGs. According to another embodiment of this aspect, each bearer within an RBG has a bearer priority, the descending priority weight order corresponding to the bearer priorities within each RBG.

According to another embodiment of this aspect, the sorted RBGs include a highest weighted RBG and successively lower-weighted RBGs and determining the uplink resource maximum allotment for each wireless device includes estimating a total number of available uplink resources in a current transit time interval (TTI). When the estimated buffer size of the highest weighted RBG is greater than the total number of available uplink resources, the highest weighted RBG is assigned a maximum number of uplink resources equal to the total number of available uplink resources. When the estimated buffer size of the highest weighted RBG is less than the total number of available uplink resources, the estimated buffer size of the highest weighted RBG and the estimated buffer size of each successively lower-weighted RBG are incrementally summed until a final RBG is added that renders the sum of the estimated buffer size of the highest weighted RBG and the estimated buffer size of each successive lower-weighted RBG greater than the total number of available uplink resources. The final RBG is assigned a maximum number of uplink resources equal to a difference between the total number of available uplink resources and the sum of the estimated buffer size of the highest weighted RBG and a total of the estimated buffer size of each successively lower-weighted RBG before the final RBG.

According to another embodiment of this aspect, determining the uplink resource maximum allotment for each wireless device is further based on a number of allocated uplink resources that are needed to carry data corresponding to the estimated buffer size for each RBG wherein the number of allocated uplink resources needed for each RBG is estimated based on the estimated buffer size of the RBG and a channel quality estimation. According to another embodiment of this aspect, modifying the total number of available uplink resources is based on a resource utilization threshold. According to another embodiment of this aspect, the resource utilization threshold is greater than 100%.

According to another embodiment of this aspect, the resource utilization threshold is adjusted dynamically based at least upon one of an amount of free-riding data in a previous TTI and a previous resource utilization. According to another embodiment of this aspect, determining the uplink resource maximum allotment for each wireless device includes assigning a number of uplink resources to each RBG that the wireless device uses and combining the number of uplink resources assigned to each RBG that the wireless device uses to determine the uplink resource maximum allotment for the wireless device.

According to another broad aspect of the disclosure, a node configured for uplink scheduling of a plurality of wireless devices in a communications network is provided. The node includes circuitry, the circuitry including a processor and a memory storing instructions that, when executed, configure the processor to estimate, for each of a plurality of wireless devices, a buffer size corresponding to each of at least one radio bearer group (RBG), each of the at least one RBG being used by the wireless device to carry traffic via multiple bearers, and determine an uplink resource maximum allotment for each wireless device based, at least in part, on the estimated buffer sizes and a priority weight of each RBG used by the plurality of wireless devices, the priority weight of each RBG being based at least in part on quality of service (QoS) requirements of bearers carried by the RBG.

According to another embodiment of this aspect, each RBG contains bearer traffic having like QOS requirements. According to another embodiment of this aspect, determining the uplink resource maximum allotment for each wireless device includes sorting each RBG in descending priority weight order, and assigning a maximum number of uplink resources to each sorted RBG in an order corresponding to the descending priority weight order of the RBGs. According to another embodiment of this aspect, each bearer within an RBG has a bearer priority, the descending priority weight order corresponding to the bearer priorities within each RBG.

According to another embodiment of this aspect, the sorted RBGs include a highest weighted RBG and successively lower-weighted RBGs and determining the uplink resource maximum allotment for each wireless device includes estimating a total number of available uplink resources in a current transit time interval (TTI). When the estimated buffer size of the highest weighted RBG is greater than the total number of available uplink resources, the highest weighted RBG is assigned a maximum number of uplink resources equal to the total number of available uplink resources. When the estimated buffer size of the highest weighted RBG is less than the total number of available uplink resources, the estimated buffer size of the highest weighted RBG and the estimated buffer size of each successively lower-weighted RBG are incrementally summed until a final RBG is added that renders the sum of the estimated buffer size of the highest weighted RBG and the estimated buffer size of each successive lower-weighted RBG greater than the total number of available uplink resources. The final RBG is assigned a maximum number of uplink resources equal to a difference between the total number of available uplink resources and the sum of the estimated buffer size of the highest weighted RBG and a total of the estimated buffer size of each successively lower-weighted RBG before the final RBG.

According to another embodiment of this aspect, determining the uplink resource maximum allotment for each wireless device is further based on a number of allocated uplink resources that are needed to carry data corresponding to the estimated buffer size for each RBG, wherein the number of allocated uplink resources needed for each RBG is estimated based on the estimated buffer size of the RBG and a channel quality estimation. According to another embodiment of this aspect, the processor is further configured to modify the total number of available uplink resources based on a resource utilization threshold. According to another embodiment of this aspect, the resource utilization threshold is greater than 100%. According to another embodiment of this aspect, the resource utilization threshold is adjusted dynamically based at least upon one of an amount of free-riding data in a previous TTI and a previous resource utilization.

According to another embodiment of this aspect, determining the uplink resource maximum allotment for each wireless device includes assigning a number of uplink resources to each RBG that the wireless device uses and combining the number of uplink resources assigned to each RBG that the wireless device uses to determine the uplink resource maximum allotment for the wireless device. According to another embodiment of this aspect, a communication interface is configured to transmit an uplink scheduling grant to each wireless device based on at least the determined uplink resource maximum allotment for the wireless device.

According to yet another broad aspect of the disclosure, a node configured for uplink scheduling of a plurality of wireless devices in a communications network is provided. The node includes an estimating module configured to estimate, for each of a plurality of wireless devices, a buffer size corresponding to each of at least one radio bearer group (RBG), each of the at least one RBG being used by the wireless device to carry traffic via multiple bearers. The node further includes a determination module configured to determine an uplink resource maximum allotment for each wireless device based, at least in part, on the estimated buffer sizes and a priority weight of each RBG used by the plurality of wireless devices. The priority weight of each RBG is based at least in part on quality of service (QoS) requirements of bearers carried by the RBG.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
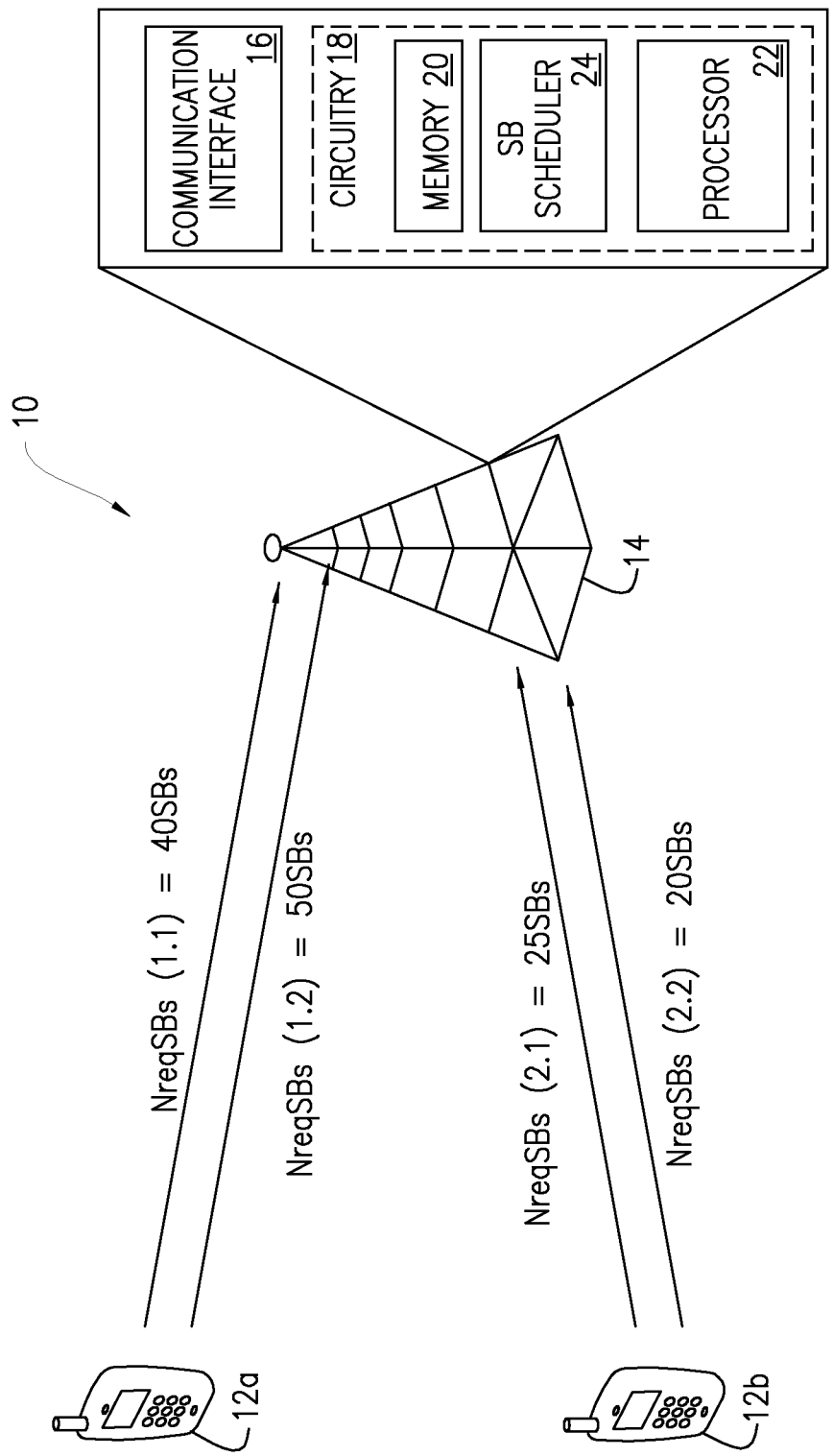
FIG. 1 is diagram illustrating an exemplary system for uplink scheduling of a plurality of wireless devices in a communications network in accordance with principles of the present disclosure.

The methods and nodes described herein advantageously provide uplink scheduling that reduces the amount of free-riding data in uplink transmission data transmissions from wireless devices. Instead of scheduling uplink transmissions from wireless devices according to the combined weights of their bearer groups, the present disclosure advantageously sets a constraint on the maximum number of uplink resources such as, for example, scheduling blocks (SBs) that can be scheduled to each wireless device in the uplink scheduler. The constraint can be adjusted dynamically based on the available resources, the buffer status and the QoS requirements of the wireless devices' bearer groupings. A benefit of the methods and node described herein is that free-riding data traffic in the uplink transmission can be significantly decreased or eliminated by determining constraints for each radio bearer group in order to limit the number of uplink resources that can be scheduled for the wireless devices. The constraints may be calculated based on, for example, the available resources, the buffer status and the QoS requirements of wireless devices' bearer groups as well as a resource utilization threshold. The resource utilization threshold may be tunable for better performance based on feedback such as resource utilization and the amount of free-riding data traffic. The method described herein can be extended to other kinds of communication networks, when per-wireless device based uplink scheduling is used.

Before describing in detail exemplary embodiments that are in accordance with the disclosure, it is noted that the embodiments reside primarily in combinations of apparatus components and processing steps related to uplink scheduling of wireless devices in a communications network. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. In addition, the terms "class" and "category" are used interchangeably herein as well as the terms "classifying" and "categorizing."

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring now to drawing figures in which like reference designators refer to like elements there is shown in FIG. 1 an exemplary system for uplink scheduling of a plurality of wireless devices in a communications network designated generally as "10." Network 10 may be any wireless communication network including, for example, a Long Term Evolution (LTE) Radio Access Network (RAN). It will be understood, however, that the present disclosure is not limited to such embodiments and may be embodied generally in any type of wireless communication network according to one or more radio access technologies. In FIG. 1, an exemplary embodiment of the present disclosure is shown. In FIG. 1, two wireless devices 12*a* and 12*b* (collectively referred to herein as "wireless devices 12") are shown. Although two wireless devices 12*a* and 12*b* are shown in FIG. 1, this depiction is exemplary and the disclosure is not limited to only two wireless devices. Wireless devices 12, which may include, for example, user equipment (UE), including devices used for machine type communication, machine to machine communication, sensors, USB, wireless embedded devices, laptop mounted devices, tablet computers, etc., are in wireless communication with node 14. Node 14 may be a base station such as, for example, an evolved Node B (eNB). However, node 14 may also refer to a radio base station, base transceiver station, base station controller, network controller, Radio Network Controller (RNC), relay node, positioning node, Evolved-Serving Mobile Location Center (E-SMLC), location server, repeater, access point, radio access point, Core network node and/or Mobile Management Entity (MME), among other network nodes known in the art. Node 14 includes a communication interface 16, and circuitry 18 including a memory 20 and a processor 22.

Circuitry 18 may also include an SB scheduler 24. These components are discussed in greater detail below.

Figure 2:
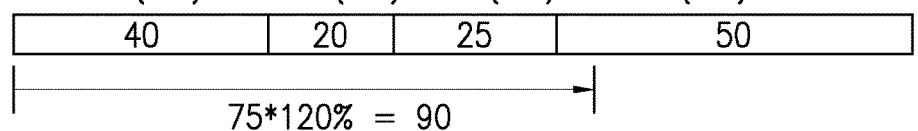
FIG. 2 is a diagram illustrating an exemplary embodiment where radio bearer groups are weighted and uplink resources are allocated to each radio bearer group in accordance with principles of the present disclosure.

In the example depicted in FIG. 1 and FIG. 2, wireless device 12 has two radio bearer groups (RBGs). It is conceivable and within the scope of the present disclosure that wireless devices 12 include any number of RBGs. In one embodiment, the RBGs for each wireless device 12 each contain services with similar QoS requirements. In the LTE scenario, these RBGs are referred to as Logical Channel Groups (LCGs). Referring to FIG. 1, $N_{reqSBs}(i,j)$ refers to the required number of SBs of the jth bearer grouping of wireless device(i). In the embodiment shown in FIG. 1, the estimated buffer size of the two RBGs for wireless device 12a are 40 SBs and 50 SBs respectively. The estimated buffer size of the two RBGs for wireless device 12b are 25 SBs and 20 SBs respectively. Thus, the estimated buffer size, i.e., the combined total number of uplink resources, i.e., SBs, required for wireless device 12a is 90 and the combined total number of uplink resources, i.e., SBs, required for wireless device 12b is 45.

Referring now to FIG. 2, each RBG is ordered according to its respective weight, in decreasing weight order. Weights can be assigned to each RBG according to, for example, its radio bearer priority. RBG (i,j) represents the jth RBG of wireless device (i). Thus, in FIG. 2, RBG (1.1) refers to the first RBG for the first wireless device 12a and is given the highest weight of the four RBGs. RBG (1.1) has an estimated buffer size of 40 SBs. RBG (2.2), which refers to the second RBG for the second wireless device 12b is given the next highest weight. RBG (2.2) has an estimated buffer size of 20 SBs. RBG (2.1) refers to the first RBG for the second wireless device 12b and is assigned the next highest weight. RBG (2.1) has an estimated buffer size of 25 SBs. Finally, RBG (1.2) refers to the second RBG in the first wireless device 12a. RBG (1.2) has an estimated buffer size of 50 SBs.

A resource utilization threshold may be assigned. Since the actual allocation of SBs is based on the subband channel quality whereas the required number of SBs is usually estimated by using the wideband channel quality, in certain instances, the number of allocated SBs may be different from the estimated value. To prevent over-estimation of the required number of SBs, the resource utilization threshold may be set to a value that is higher than 100%. If resource under-utilization is still detected, the threshold can be adjusted again to an even higher value. By utilizing the actual amount of free-riding data from a previous calculation, the resource utilization threshold can be adjusted downwards and the scheduling constraint can be even more stringent. When the threshold is more stringent, more free-riding data traffic can be avoided. In this way, the threshold can be adjusted dynamically to achieve better performance based on feedback such as the resource utilization and the amount of free-riding data in previous TTIs.

The embodiment depicted in FIG. 2 assumes a resource utilization threshold to be set at 120%, and the number of available uplink resources in the current TTI to be 75 SBs. It should be noted that while the present disclosure refers to providing constraints on the allocation of SBs for each wireless device 12 in network 10, present disclosure is not limited to assigning available SBs to wireless devices 12 and their RBGs, but may also providing constraints on the allocation of other uplink resources. Thus, although the terms "SBs" and available "uplink resources" are used interchangeably herein, the present disclosure is not limited to only assigning and/or providing constraints on available scheduling blocks. Based on the exemplary resource utilization threshold discussed above with regard to FIG. 2, the total number of available SBs is adjusted to 90 (the product of the available uplink resources, which is 75, and the resource utilization threshold, which is 120%). The remaining SBs of the system bandwidth may be occupied by control messages such as, for example, Physical Uplink Control Channel (PUCCH) or re-transmissions.

In one embodiment, the estimated buffer size of the highest weighted RBG is compared to the total number of available uplink resources. If the estimated buffer size of the highest weighted RBG is greater than the total number of available uplink resources, the highest weighted RBG is assigned a maximum number or allotment of uplink resources equal to the total number of available uplink resources. Thus, for example, if the estimated buffer size of RBG (1.1) was 95, this would be greater than the total number of available uplink resources, 90, and RBG (1.1) would be assigned 90 SBs, which represents the maximum number of available uplink SBs. However, in the present embodiment, the estimated buffer size of RBG (1.1), which is the highest weighted RBG, is less than the total number of available uplink resources. In this instance, the estimated buffer size of the highest weighted RBG (RBG (1.1)) is incrementally summed with the estimated buffer size of each successively lower-weighted RBG until a final RBG is added that renders the sum of the estimated buffer size of the highest weighted RBG and the estimated buffer size of each successive lower-weighted RBG greater than the total number of available uplink resources. For example, as discussed above, the estimated buffer size of RBG (1.1), i.e., 40, is less than the number of available resources, i.e., 90. Thus, the estimated buffer size of the next highest weighted RBG (RBG (2.2)), i.e., 20, is added to the estimated buffer size of RBG (1.1), i.e., 40, resulting in a total of 60. Since this total is still less than the total number of available uplink SBs, i.e., 90, the estimated buffer size of the next highest weighted RBG (RBG (2.1)) is added to the total previously calculated. The estimated buffer size for RBG (2.1) is 25 and this is added to 60, resulting in a total buffer size of 85. Because this total is still less than the total number of available uplink resources (i.e., SBs), the estimated buffer size of the next highest weighted RBG is considered. RBG (1.2) has an estimated buffer size of 50. Because the addition of this buffer size to the previously incrementally summed total results in a total buffer size, i.e., 135 that is greater than the number of available uplink SBs, i.e., 90, RBG (1.2) is only assigned 5 SBs (rather than 50), where 5 represents the difference between the total number of available SBs, i.e., 90, and the total of the previously summed estimated buffer sizes for RBG (1.1), RBG, (2.2) and RBG (2.1), which totaled 85. Thus, the constraint on the maximum number of schedulable SBs for wireless device 12a is 45, i.e., 40 for RBG (1.1) and 5 for RBG (1.2), and the constraint on the maximum number of schedulable SBs for wireless device 12b is 45, i.e., 20 for RBG (2.2) and 25 for RBG (2.1). It should be noted that although the uplink resource maximum allotment determined for each wireless device happens to be the same amount—45 SBs—in this example, the maximum allotment could vary from device to device depending on the particular parameters used to determine each maximum allotment.

If the methodology of the present disclosure had not been used in the current example, the scheduling entity would have assigned all of the available SBs to wireless device 12a, because the weight of wireless device 12a is determined by RBG (1.1) and the total buffer size of RBG (1.1) and RBG (1.2) is counted when scheduling wireless device 12a. In that scenario, wireless device 12a would use all of the available SBs and none would be assigned to wireless device 12b even though the RBGs of wireless device 12b have a higher weight than RBG (1.2), and the data associated with the 50 SBs assigned to RBG (1.2) would be considered "free-riding" data. By utilizing the methods described herein, only 5 SBs are assigned to RBG (1.2), and the maximum number of SBs that can be scheduled to each wireless device 12 is reduced to 45 SBs each. Therefore, using the methods disclosed herein, the data from wireless device 12b can have a much higher probability of being scheduled.

Figure 3:
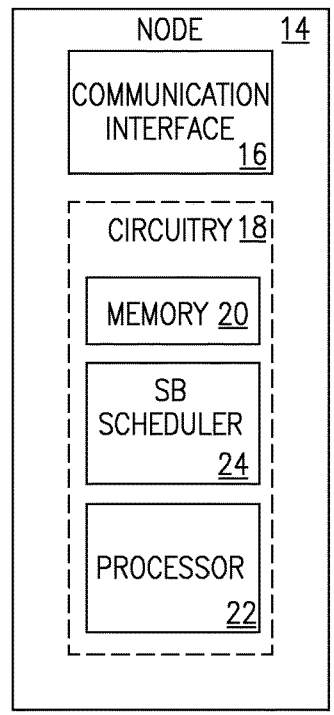
FIG. 3 is a block diagram of an exemplary node utilizing the principles of the present disclosure.

FIG. 3 is a block diagram of an exemplary node 14 configured to schedule uplink transmissions for one or more wireless devices 12 in accordance with the principles of the present disclosure. Node 14 includes communication interface 16 configured to receive scheduling requests and BSRs from wireless devices 12. Communication interface 16 is also configured to transmit uplink scheduling grants to each wireless devices 12 based on at least the determined uplink resource maximum allotment for each wireless device 12. Each wireless device 12 may then transmit data to node 14 according to the received scheduling grants.

Node 14 also includes circuitry 18, which includes memory 20 and processor 22. Circuitry 18 may be any volatile or non-volatile storage device capable of storing data including, for example, solid-state memory, optical storage and magnetic storage. Processor 22 may include one or more hardware components such as application specific integrated circuits (ASICs) that provide some or all of the functionality described herein. In another embodiment, processor 22 may include one or more hardware components, e.g., Central Processing Units (CPUs), and some or all of the functionality described herein is implemented in software stored in, e.g., memory 20 and executed by processor 22. In yet another embodiment, processor 22 and memory 20 form processing means (not shown) configured to perform the functionality described herein.

Node 14 may be configured for uplink scheduling of a plurality of wireless devices 12 in communications network 10. Memory 20 may include SB scheduler 24 that performs the uplink scheduling functions for wireless devices 12 discussed herein. Although processor 22 is described herein as performing these functions, the present disclosure encompasses embodiments whereby a separate scheduling entity, i.e., SB scheduler 24 may also perform these functions either with or without processor 22. SB scheduler 24 may include one or more additional processors, memory, and additional hardware and software to enable SB scheduler 24 to perform the uplink scheduling functions disclosed herein. Memory 20 stores instructions that when executed by processor 22 and/or SB scheduler 24 estimates, for each of the plurality of wireless devices 12, a buffer size corresponding to each of at least one RBG, each of the at least one RBG being used by wireless devices 12 to carry traffic via multiple bearers. Processor 22 and/or SB scheduler 24 are also configured to determine an uplink resource maximum allotment for each wireless device 12 based, at least in part, on the estimated buffer sizes and a priority weight of each RBG used by the plurality of wireless devices 12, the priority weight of each RBG being based at least in part on QoS requirements of bearers carried by the RBG. In one embodiment, each RBG contains bearer traffic having like QOS requirements. As discussed above and illustrated in FIG. 2, determining the uplink resource maximum allotment for each wireless device 12 includes sorting each RBG in descending priority weight order, and assigning a maximum number of uplink resources, such as available SBs, to each sorted RBG in an order corresponding to the descending priority weight order of the RBGs. In one embodiment, each bearer within an RBG has a bearer priority, the descending priority weight order corresponding to the bearer priorities within each RBG.

As discussed above, the sorted RBGs include a highest weighted RBG and successively lower-weighted RBGs. With reference to an exemplary implementation, processor 22 and/or SB scheduler 24 are configured to determine the uplink resource maximum allotment for each wireless device 12 by estimating a total number of available uplink resources in the current TTI. When the estimated buffer size of the highest weighted RBG is greater than the total number of available uplink resources, processor 22 and/or SB scheduler 24 assign the highest weighted RBG a maximum number of uplink resources equal to the total number of available uplink resources. When the estimated buffer size of the highest weighted RBG is less than the total number of available uplink resources, processor 22 and/or SB scheduler 24 incrementally sum the estimated buffer size of the highest weighted RBG and the estimated buffer size of each successively lower-weighted RBG until a final RBG is added that renders the sum of the estimated buffer size of the highest weighted RBG and the estimated buffer size of each successive lower-weighted RBG greater than the total number of available uplink resources. In the example illustrated in FIG. 2, RBG (1.2), i.e., estimated buffer size of 50, is the final RBG that rendered the sum of the estimated buffer size of the highest weighted RBG and the estimated buffer size of each successive lower-weighted RBG greater than the total number of available uplink resources, i.e., 75. Finally, processor 22 and/or SB scheduler 24 are configured to assign to the final RBG, a maximum number of uplink resources equal to a difference between the total number of available uplink resources and the sum of the estimated buffer size of the highest weighted RBG and a total of the estimated buffer size of each successively lower-weighted RBG before the final RBG. In the example depicted in FIGS. 1 and 2, RBG (1.2) is assigned 5 rather than 50 SBs, thus eliminating "free riding" data to be transmitted by wireless device 12a for RBG (1.2).

In one embodiment, determining the uplink resource maximum allotment for each wireless device 12 is further based on a number of allocated uplink resources that are needed to carry data corresponding to the estimated buffer size for each RBG, wherein the number of allocated uplink resources needed for each RBG is estimated based on the estimated buffer size of the RBG and a channel quality estimation. In one embodiment, processor 22 and/or SB scheduler 24 are further configured to modify the total number of available uplink resources based on a resource utilization threshold. The resource utilization threshold may be any range including greater than 100%. In one embodiment, the resource utilization threshold is adjusted dynamically based at least upon one of an amount of free-riding data in a previous TTI and a previous resource utilization. In one embodiment, determining the uplink resource maximum allotment for each wireless device 12 includes assigning a number of uplink resources to each RBG in each wireless device 12 in the manner described herein and combining the number of uplink resources assigned to each RBG that the wireless device 12 uses to determine the uplink resource maximum allotment for the wireless device 12. Thus, in the example illustrated in FIGS. 1 and 2, wireless device 12a is assigned a maximum allotment of 45 SBs, i.e., 40 SBs for RBG (1.1) and 5 SBS for RBG (1.2) and wireless device 12b is also assigned a maximum allotment of 45 SBs, i.e., 20 SBs for RBG (2.2) and 25 SBs for RBG (2.1). This illustrates the equitable distribution of assigned SBs using the methods disclosed herein.

Figure 4:
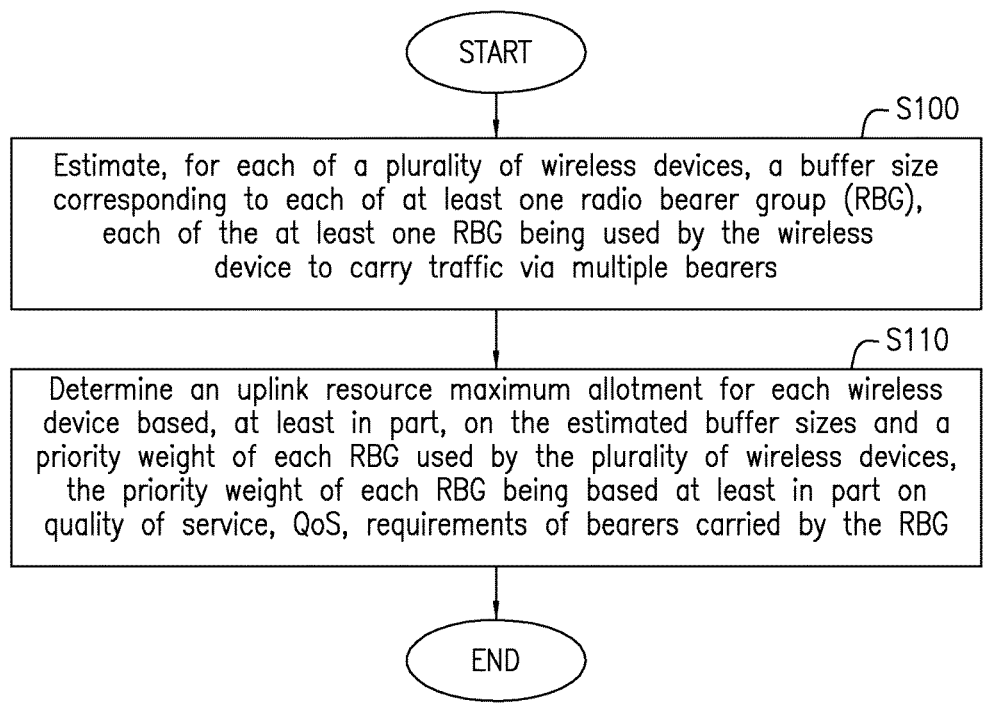
FIG. 4 is a flow diagram illustrating an exemplary uplink scheduling process performed in accordance with principles of the present disclosure.

FIG. 4 is a flowchart illustrating steps performed by processor 22 and/or SB scheduler 24 of node 14 utilizing the principles of the present disclosure. It should be noted that the scheduling functions disclosed herein need not be performed solely by node 14, but may also be performed by a separate scheduling entity in communication with node 14. In one embodiment, processor 22 and/or SB scheduler 24 estimates, for each of a plurality of wireless devices 12, a buffer size corresponding to each of at least one RBG, where each of the at least one RBG are used by wireless devices 12 to carry traffic via multiple radio bearers (Block S100). Processor 22 and/or SB scheduler 24 then determine an uplink resource maximum allotment, for example, the maximum number of SBs that may be assigned, to each wireless device 12 based at least in part on the estimated buffer sizes and a priority weight of each RBG used by the plurality of wireless devices 12, where the priority weight of each RBG is based at least in part on the QoS requirements of the bearers carried by the RBG (Block S110).

In one embodiment, each RBG contains bearer traffic having like QoS requirements. Processor 22 and/or SB scheduler 24, in determining the uplink resource maximum allotment for each wireless device, sort each RBG in descending priority weight order, and assign a maximum number of uplink resources, such as available SBs, to each sorted RBG in an order corresponding to the descending priority weight order of the RBGs. In one embodiment, each bearer within an RBG has a bearer priority in which the descending priority weight order corresponds to the bearer priorities within each RBG.

Figure 5:
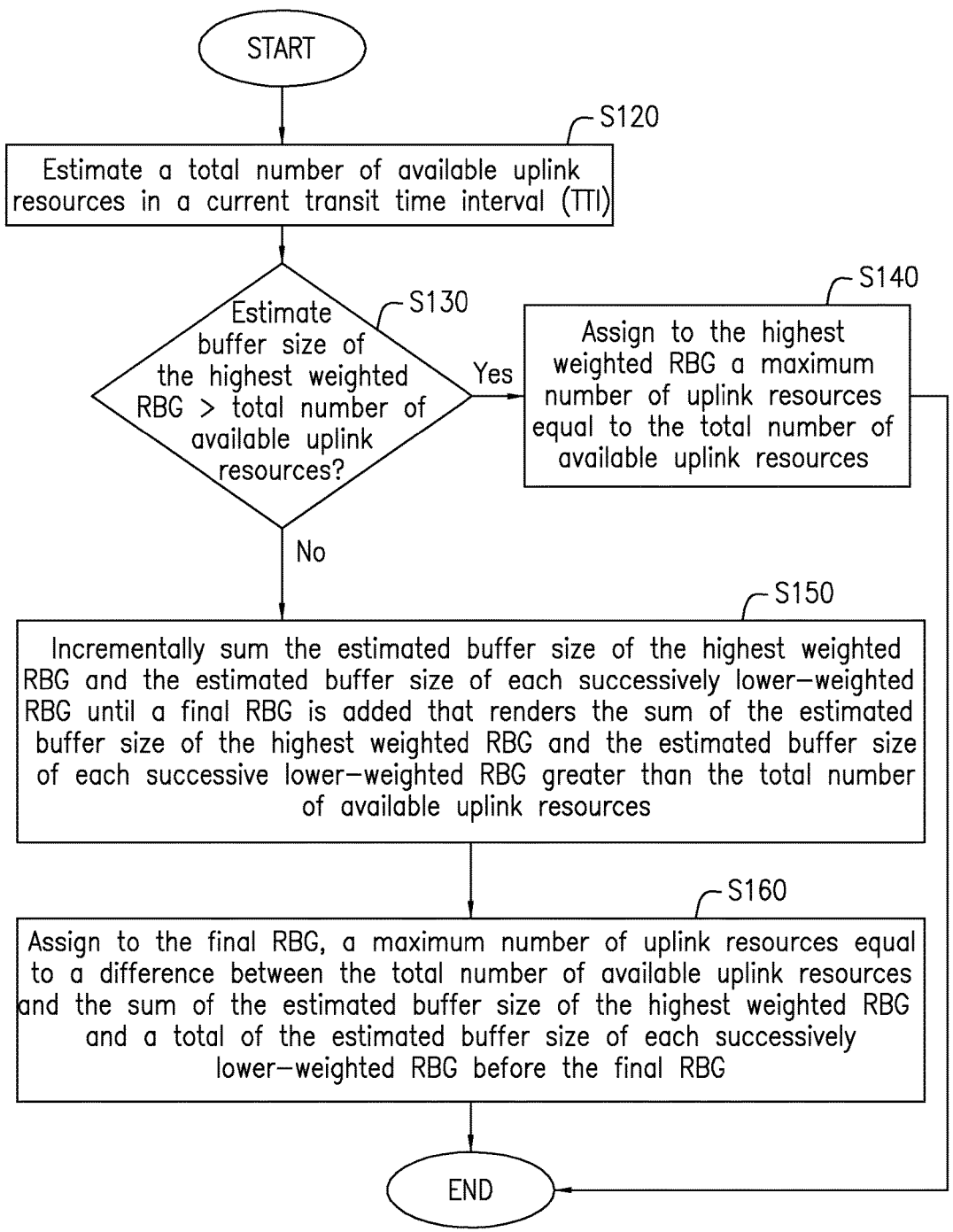
FIG. 5 is a flow diagram illustrating another exemplary uplink scheduling process performed in accordance with principles of the present disclosure.

FIG. 5 is a flowchart illustrating, in one embodiment, how processor 22 and/or SB scheduler 24 determine the uplink resource maximum allotment for each wireless device 12. As discussed above, the sorted RBGs include a highest weighted RBG and successively lower-weighted RBGs. In one embodiment, determining the uplink resource maximum allotment for each wireless device 12 includes estimating a total number of available uplink resources in the current TTI (Block S120). If processor 22 and/or SB scheduler 24 determine that the estimated buffer size of the highest weighted RBG is greater than the total number of available uplink resources (Block S130), the highest weighted RBG is assigned a maximum number of uplink resources equal to the total number of available uplink resources (Block S140). If processor 22 and/or SB scheduler 24 determine that the estimated buffer size of the highest weighted RBG is less than the total number of available uplink resources, the estimated buffer size of the highest weighted RBG and the estimated buffer size of each successively lower-weighted RBG are incrementally summed until a final RBG is added that renders the sum of the estimated buffer size of the highest weighted RBG and the estimated buffer size of each successive lower-weighted RBG greater than the total number of available uplink resources (Block S150). Processor 22 and/or SB scheduler 24 are further configured to assign to the final RBG, a maximum number of uplink resources equal to a difference between the total number of available uplink resources and the sum of the estimated buffer size of the highest weighted RBG and a total of the estimated buffer size of each successively lower-weighted RBG before the final RBG (Block S160).

In one embodiment, determining the uplink resource maximum allotment for each wireless device 12 is further based on a number of allocated uplink resources that are needed to carry data corresponding to the estimated buffer size for each RBG, wherein the number of allocated uplink resources needed for each RBG is estimated based on the estimated buffer size of the RBG and a channel quality estimation. In one embodiment, processor 22 and/or SB scheduler 24 are further configured to modify the total number of available uplink resources based on a resource utilization threshold. The resource utilization threshold may be any range including greater than 100%. In one embodiment, the resource utilization threshold is adjusted dynamically based at least upon one of an amount of free-riding data in a previous TTI and a previous resource utilization. In one embodiment, determining the uplink resource maximum allotment for each wireless device 12 includes assigning a number of uplink resources to each RBG in each wireless device 12 in the manner described herein and combining the number of uplink resources assigned to each RBG that the wireless device 12 uses to determine the uplink resource maximum allotment for the wireless device 12.

Figure 6:
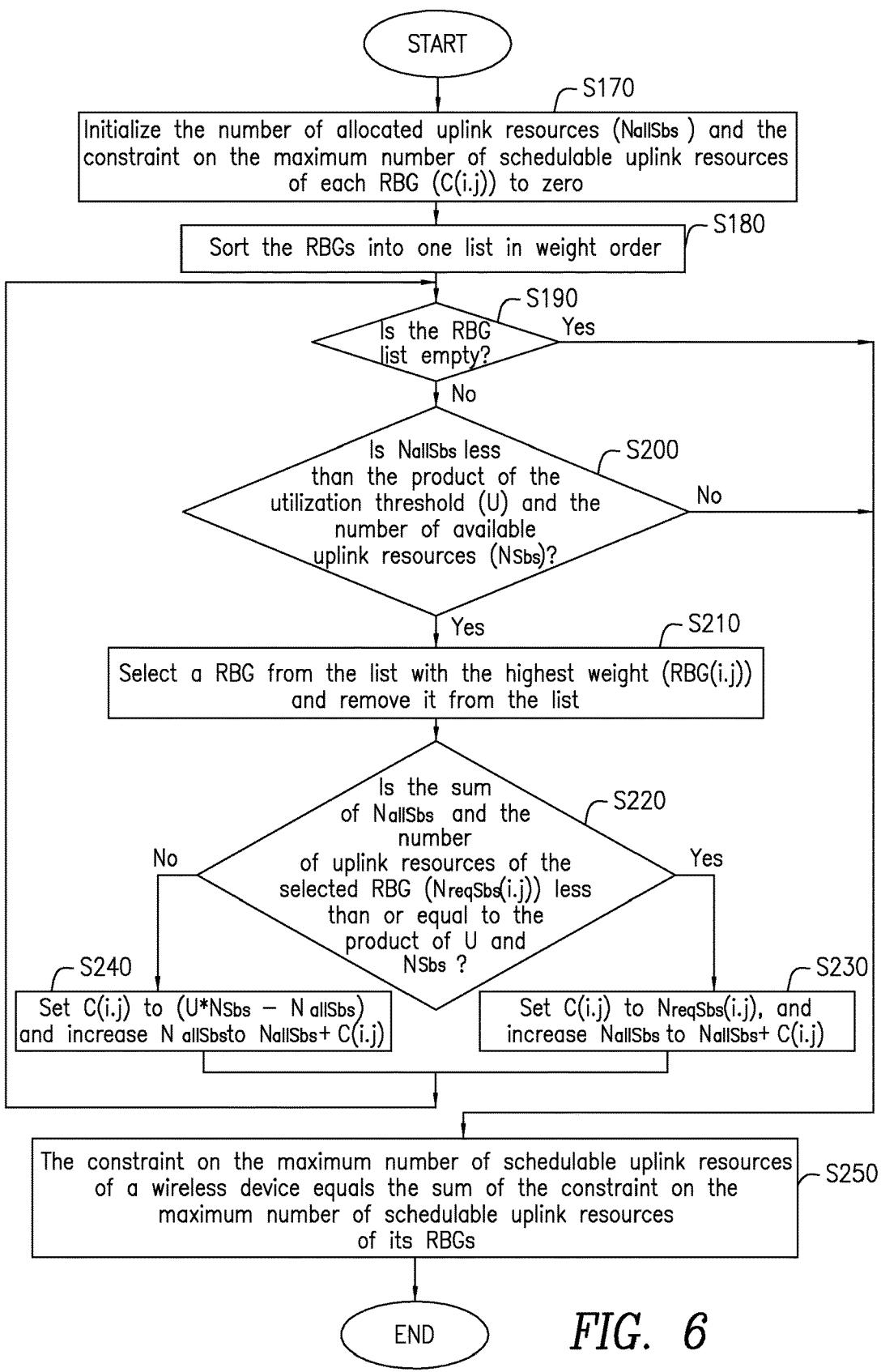
FIG. 6 is a flow diagram illustrating yet another exemplary uplink scheduling process performed in accordance with principles of the present disclosure.

FIG. 6 depicts a flowchart illustrating yet another embodiment of the present disclosure. FIG. 6 represents steps performed by processor 22 and/or SB scheduler 24 to schedule uplink transmissions for one or more wireless devices 12 in communications network 10 according to the principles of the present disclosure. Initially, the number of allocated uplink resources ($N_{allSbs}$) and the constraint on the maximum number of schedulable uplink resources of each RBG ($C(i,j)$) is initialized to zero (Block S170). The RBGs are then sorted into a list in weight order (Block S180). It is then determined if the RBG list is empty (Block S190). If the RBG list is empty, the constraint on the maximum number of schedulable uplink resources of wireless device 12 is set to equal the sum of the constraint on the maximum number of schedulable uplink resources of its RBG (Block S250). However, if the RBG is not empty, it is determined if the number of allocated uplink resources ($N_{allSbs}$) is less than the product of the utilization threshold and the number of available number of uplink resources (Block S200). In the example illustrated in FIGS. 1 and 2, the utilization threshold was set to 120% and the number of available uplink resources, i.e., available SBs, was 75.

If it is determined that the number of allocated uplink resources 1 is less than the product of the utilization threshold and the number of available number of uplink resources, an RBG (RBG(i,j)) with the highest weight is selected and removed from the list (Block S210). If the sum of allocated uplink resources ($N_{allSbs}$) and the number of uplink resources of the selected RBG ($N_{reqSbs}(i,j)$) is less than or equal to the product of the utilization threshold (U) and the number of available uplink resources ($N_{Sbs}$) (Block S220), the constraint on the maximum number of schedulable uplink resources of each RBG $C(i,j)$ is set to the number of uplink resources of the selected RBG ($N_{reqSbs}(i,j)$), and the number of allocated uplink resources ($N_{allSbs}$) is increased by the amount of the constraint, i.e., ($N_{allSbs}+C(i,j)$ (Block S230). If the sum of all allocated uplink resources ($N_{allSbs}$) and the number of uplink resources of the selected RBGs ($N_{reqSbs}(i,j)$) is greater than the product of the utilization threshold (U) and the number of available uplink resources ($N_{Sbs}$), the constraint on the maximum number of schedulable uplink resources of each RBG ($C(i,j)$) is set to the difference between the product of the utilization threshold (U) and the number of available uplink resources ($N_{allSbs}$) and the number of allocated uplink resources ($N_{allSbs}$) is increased by an amount equal to the maximum number of schedulable uplink resources of each RBG ($C(i,j)$) (Block S240).

Figure 7:
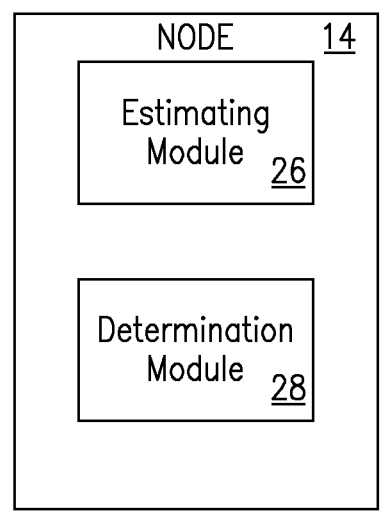
FIG. 7 is a block diagram of another exemplary node utilizing the principles of the present disclosure.

FIG. 7 illustrates an alternate embodiment of node 14 according to the principles of the present disclosure. Node 14 is configured for uplink scheduling of a plurality of wireless devices 12 in communications network 10 and, in one embodiment, includes estimating module 26 and determination module 28. Estimating module 26 may be configured to estimate, for each of the plurality of wireless devices 12, a buffer size corresponding to each of at least one radio bearer group (RBG), each of the at least one RBG being used by the wireless device 12 to carry traffic via multiple bearers. Determination module 28 may be configured to determine an uplink resource maximum allotment for each wireless device 12 based, at least in part, on the estimated buffer sizes and a priority weight of each RBG used by the plurality of wireless devices 12. The priority weight of each RBG is based at least in part on quality of service (QoS) requirements of bearers carried by the RBG.

As will be appreciated by one of skill in the art, the concepts described herein may be embodied as a method, data processing system, and/or computer program product. Accordingly, as noted above, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Although some of the diagrams include arrows on communication paths to show a primary direction of communication, it is to be understood that communication may occur in the opposite direction to the depicted arrows. Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments may be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure, which is limited only by the following claims.

What is claimed is:

1. A method for uplink scheduling of a plurality of wireless devices in a communications network, the method comprising:

estimating, for each of a plurality of wireless devices, a buffer size corresponding to each of at least one radio bearer groups, RBG, each of the at least one RBG being used by the wireless device to carry traffic via multiple bearers; and determining an uplink resource maximum allotment for each wireless device based, at least in part, on the estimated buffer sizes and a priority weight of each RBG used by the plurality of wireless devices, the priority weight of each RBG being based at least in part on quality of service, QoS, requirements of bearers carried by the RBG, determining the uplink resource maximum allotment for each wireless device comprising:

sorting each RBG in descending priority weight order, the sorted RBGs including a highest weighted RBG and successively lower-weighted RBGs; and assigning a maximum number of uplink resources to each sorted RBG in an order corresponding to the descending priority weight order of the RBGs; and determining the uplink resource maximum allotment for each wireless device further comprising:

estimating a total number of available uplink resources in a current transit time interval, TTI;

when the estimated buffer size of the highest weighted RBG is greater than the total number of available uplink resources, assigning to the highest weighted RBG a maximum number of uplink resources equal to the total number of available uplink resources;

when the estimated buffer size of the highest weighted RBG is less than the total number of available uplink resources, incrementally summing the estimated buffer size of the highest weighted RBG and the estimated buffer size of each successively lower-weighted RBG until a final RBG is added that renders the sum of the estimated buffer size of the highest weighted RBG and the estimated buffer size of each successive lower-weighted RBG greater than the total number of available uplink resources; and assigning, to the final RBG, a maximum number of uplink resources equal to a difference between the total number of available uplink resources and the sum of the estimated buffer size of the highest weighted RBG and a total of the estimated buffer size of each successively lower-weighted RBG before the final RBG.

2. The method to claim 1, wherein each RBG contains bearer traffic having like QOS requirements.

3. The method of claim 1, wherein each bearer within an RBG has a bearer priority, the descending priority weight order corresponding to the bearer priorities within each RBG.

4. The method of claim 1, wherein determining the uplink resource maximum allotment for each wireless device is further based on a number of allocated uplink resources that are needed to carry data corresponding to the estimated buffer size for each RBG, wherein the number of allocated uplink resources needed for each RBG is estimated based on the estimated buffer size of the RBG and a channel quality estimation.

5. The method of claim 1, further comprising modifying the total number of available uplink resources based on a resource utilization threshold.

6. The method of claim 5, wherein the resource utilization threshold is greater than 100%.

7. The method according to claim 5, wherein the resource utilization threshold is adjusted dynamically based at least upon one of an amount of free-riding data in a previous TTI and a previous resource utilization.

8. The method of claim 1, wherein determining the uplink resource maximum allotment for each wireless device comprises:

assigning a number of uplink resources to each RBG that the wireless device uses and combining the number of uplink resources assigned to each RBG that the wireless device uses to determine the uplink resource maximum allotment for the wireless device.

9. The method of claim 1, further comprising transmitting an uplink scheduling grant to each wireless device based on at least the determined uplink resource maximum allotment for the wireless device.

10. A node configured for uplink scheduling of a plurality of wireless devices in a communications network, the node comprising:

circuitry comprising:
a processor; and
a memory storing instructions that, when executed, configure the processor to:
estimate, for each of a plurality of wireless devices, a buffer size corresponding to each of at least one radio bearer group, RBG, each of the at least one RBG being used by the wireless device to carry traffic via multiple bearers; and
determine an uplink resource maximum allotment for each wireless device based, at least in part, on the estimated buffer sizes and a priority weight of each RBG used by the plurality of wireless devices, the priority weight of each RBG being based at least in part on quality of service, QoS, requirements of bearers carried by the RBG, determining the uplink resource maximum allotment for each wireless device comprising:

sorting each RBG in descending priority weight order, the sorted RBGs include a highest weighted RBG and successively lower-weighted RBGs; and assigning a maximum number of uplink resources to each sorted RBG in an order corresponding to the descending priority weight order of the RBGs;

determining the uplink resource maximum allotment for each wireless device further comprising:

estimating a total number of available uplink resources in a current transit time interval, TTI;

when the estimated buffer size of the highest weighted RBG is greater than the total number of available uplink resources, assigning to the highest weighted RBG a maximum number of uplink resources equal to the total number of available uplink resources;

when the estimated buffer size of the highest weighted RBG is less than the total number of available uplink resources, incrementally summing the estimated buffer size of the highest weighted RBG and the estimated buffer size of each successively lower-weighted RBG until a final RBG is added that renders the sum of the estimated buffer size of the highest weighted RBG and the estimated buffer size of each successive lower-weighted RBG greater than the total number of available uplink resources; and assigning, to the final RBG, a maximum number of uplink resources equal to a difference between the total number of available uplink resources and the sum of the estimated buffer size of the highest weighted RBG and a total of the estimated buffer size of each successively lower-weighted RBG before the final RBG.

11. The node of claim 10, wherein each RBG contains bearer traffic having like QOS requirements.

12. The node of Claim 10, wherein each bearer within an RBG has a bearer priority, the descending priority weight order corresponding to the bearer priorities within each RBG.

13. The node of Claim 10, wherein determining the uplink resource maximum allotment for each wireless device is further based on a number of allocated uplink resources that are needed to carry data corresponding to the estimated buffer size for each RBG, wherein the number of allocated uplink resources needed for each RBG is estimated based on the estimated buffer size of the RBG and a channel quality estimation.

14. The node of Claim 10, wherein the processor is further configured to modify the total number of available uplink resources based on a resource utilization threshold.

15. The node of claim 14, wherein the resource utilization threshold is greater than 100%.

16. The node of claim 14, wherein the resource utilization threshold is adjusted dynamically based at least upon one of an amount of free-riding data in a previous TTI and a previous resource utilization.

17. The node of claim 10, wherein determining the uplink resource maximum allotment for each wireless device comprises:
   assigning a number of uplink resources to each RBG that the wireless device uses and combining the number of uplink resources assigned to each RBG that the wireless device uses to determine the uplink resource maximum allotment for the wireless device.

18. The node of claim 10, further comprising a communication interface configured to transmit an uplink scheduling grant to each wireless device based on at least the determined uplink resource maximum allotment for the wireless device.

19. A node configured for uplink scheduling of a plurality of wireless devices in a communications network, the node comprising a circuitry having:
   an estimating module configured to estimate, for each of a plurality of wireless devices, a buffer size corresponding to each of at least one radio bearer group, RPG, each of the at least one RBG being used by the wireless device to carry traffic via multiple bearers; and
   a determination module configured to determine an uplink resource maximum allotment for each wireless device based, at least in part, on the estimated buffer sizes and a priority weight of each RBG used by the plurality of wireless devices, the priority weight of each RBG being based at least in part on quality of service, QoS, requirements of bearers carried by the RBG, determining the uplink resource maximum allotment for each wireless device comprising:
sorting each RBG in descending priority weight order, the sorted RBGs including a highest weighted RBG and successively lower-weighted RBGs; and
assigning a maximum number of uplink resources to each sorted RBG in an order corresponding to the descending priority weight order of the RBGs;
determining the uplink resource maximum allotment for each wireless device further comprising:
estimating a total number of available uplink resources in a current transit time interval, TTI;
when the estimated buffer size of the highest weighted RBG is greater than the total number of available uplink resources, assigning to the highest weighted RBG a maximum number of uplink resources equal to the total number of available uplink resources;
when the estimated buffer size of the highest weighted RBG is less than the total number of available uplink resources, incrementally summing the estimated buffer size of the highest weighted RBG and the estimated buffer size of each successively lower-weighted RBG until a final RGB is added that renders the sum of the estimated buffer size of the highest weighted RBG and the estimated buffer size of each successive lower-weighted RBG greater than the total number of available uplink resources; and
assigning, to the final RBG, a maximum number of uplink resources equal to a difference between the total number of available uplink resources and the sum of the estimated buffer size of the highest weighted RBG and a total of the estimated buffer size of each successively lower-weighted RBG before the final RBG.

* * * * *